United States Patent [19]

Mackin et al.

[11] Patent Number: 4,522,081
[45] Date of Patent: Jun. 11, 1985

[54] BOOT COVER FOR A FLOOR-MOUNTED TRANSMISSION LEVER

[75] Inventors: Steven J. Mackin, Pontiac; Harry T. Tillotson, Royal Oak, both of Mich.

[73] Assignee: General Motors Corporation, Detroit, Mich.

[21] Appl. No.: 561,321

[22] Filed: Dec. 14, 1983

[51] Int. Cl.³ .......................... G05G 9/00; F16J 15/52
[52] U.S. Cl. .................................. 74/473 R; 74/18.1; 74/566; 403/50; 403/134
[58] Field of Search ............. 74/566, 523, 491, 471 R, 74/473 R, 543, 469, 471 XY, 558.5; 403/50, 51, 403/134; D23/161; 74/18, 18.1, 18.2; 7/212 R, 212 FB, 30, 31, 33; 464/173

[56] References Cited

U.S. PATENT DOCUMENTS

| | | | |
|---|---|---|---|
| 2,847,837 | 8/1958 | Baker | 74/18 |
| 3,521,900 | 7/1970 | Sakai | 403/51 |
| 3,621,542 | 11/1971 | Getchell | 403/50 |
| 3,700,297 | 10/1972 | Fickenwirth et al. | 74/18.1 |
| 3,732,746 | 5/1973 | Fitzpatrick | 74/523 |
| 4,278,262 | 7/1981 | Mizutani et al. | 74/18.2 |

FOREIGN PATENT DOCUMENTS

| | | | |
|---|---|---|---|
| 0043809 | 1/1982 | European Pat. Off. | 74/523 |
| 904127 | 2/1954 | Fed. Rep. of Germany | 403/50 |
| 2494802 | 5/1982 | France | 403/50 |

Primary Examiner—Kenneth J. Dorner
Assistant Examiner—Vinh Luong
Attorney, Agent, or Firm—Donald F. Scherer

[57] ABSTRACT

A boot cover for enclosing a pivotally mounted automobile transmission shift lever has converging sidewalls formed in part by a plurality of spherically shaped surfaces which support rolling contact between adjacent surfaces during shifting of the shift lever from the neutral position. The center of radius of adjacent spherical surfaces alternates between a point on the shift lever determined by the distance between the boot apex and the lever pivot joint and a point on the shift lever at the boot apex. The smaller radius spherical surface is cotangent with the larger radius spherical surface immediately adjacent thereto and displaced therefrom toward the pivot joint.

3 Claims, 5 Drawing Figures

BOOT COVER FOR A FLOOR-MOUNTED TRANSMISSION LEVER

This invention relates to enclosures and more particularly to enclosures for floor-mounted automobile shift levers.

Transmission lever boot covers used in the prior art are generally pyramidal or conical in shape with the larger base of the enclosure being adjacent the vehicle floor. These boot covers are generally formed with either a bellows like sidewall or with a sidewall that folds indiscriminately upon movement of the shift lever. The transmission shift lever must be pivoted during operation to a position displaced from the neutral position.

During this displacement or pivoting of the shift lever, the boot covers of the prior art have a tendency to bunch or otherwise gather to hinder lever movement. While such gathering is not detrimental to the operation of the vehicle, it does increase the input force necessary to manually shift the transmission lever.

The present invention seeks to overcome the gathering or otherwise bunching up of the boot cover by providing for rolling contact between adjacent folding surfaces of the cover. During shift lever movement to the extreme operating positions, the adjacent surfaces of the boot cover will undergo substantial rolling contact instead of a folding action.

It is therefore an object of this invention to provide an improved boot cover for a pivotally mounted transmission shift cover wherein adjacent folding surfaces are substantially spherical in shape so that rolling action therebetween will occur during shift lever pivoting so that the cover will not hinder shift lever movement.

A further object of this invention is to provide an improved boot cover for a transmission shift lever having a pivot axis wherein the boot cover has generally converging convoluted sidewalls with the convoluted portion thereof being comprised of upper and lower spherical like surfaces with the upper of said surfaces each having a radius centered at the apex of the converging sidewalls and the lower of said surfaces having a common center of radius displaced from the apex a distance at least equal to the distance between the apexes and the lever pivot axis.

These and other objects and advantages of the present invention will be more apparent from the following description and drawings in which.

Figures 1, 2:
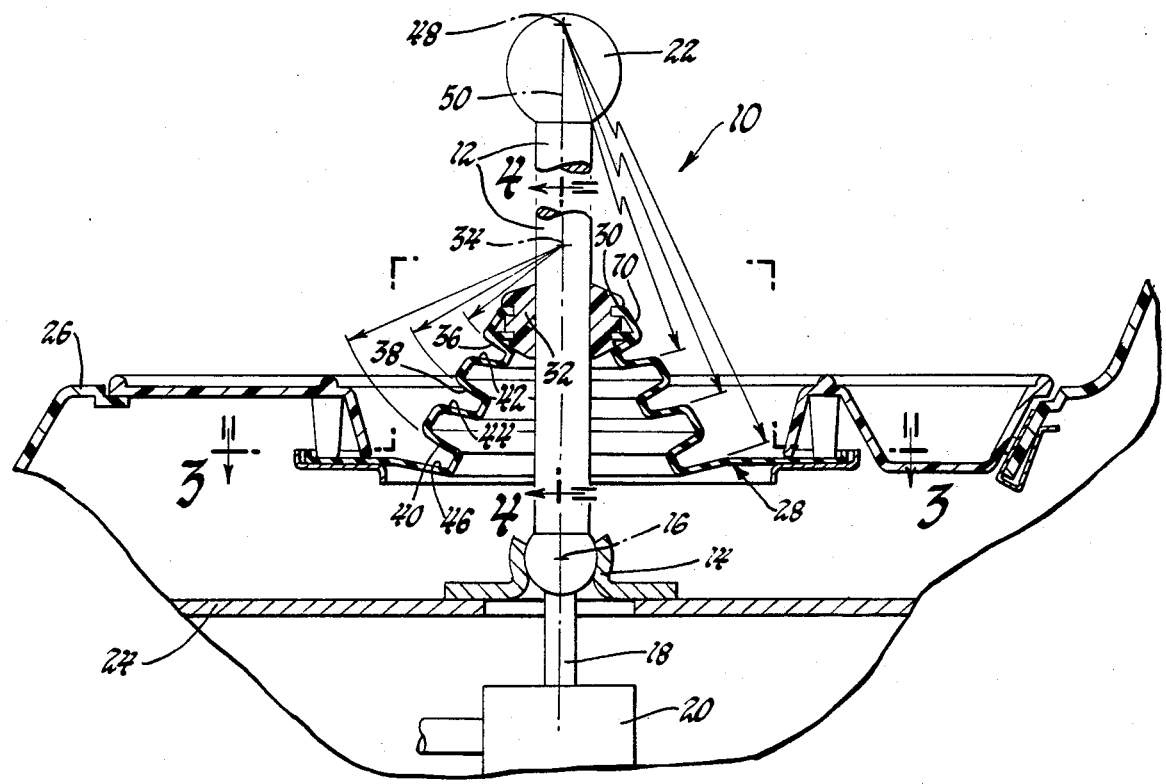
FIG. 1 is a partial sectional elevational view of a shift lever and boot cover.
FIG. 2 is a partial sectional view showing the shift lever at an extreme shifted position.
Figure 3:
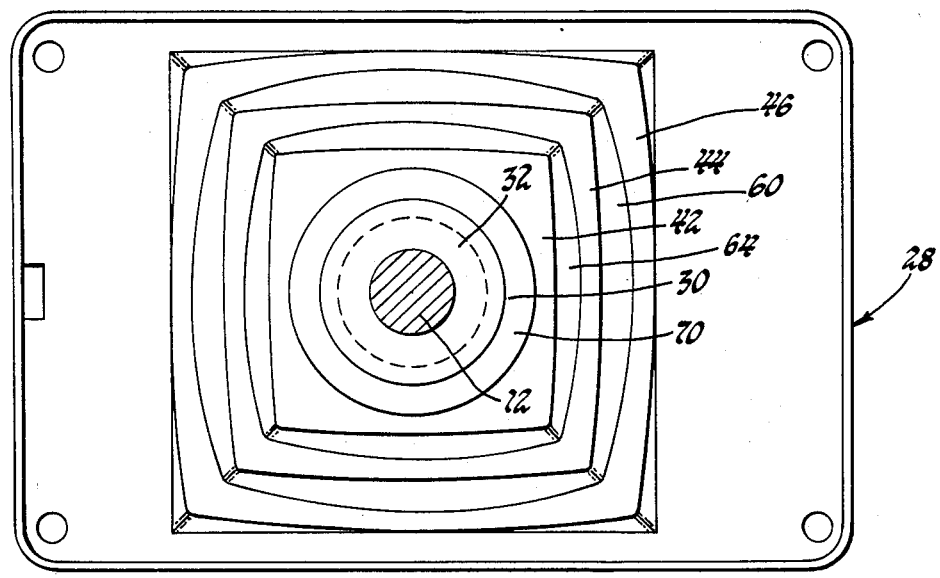
FIG. 3 is a view taken along line 3—3 of FIG. 1.

Referring to the drawings wherein like characters represent the same or corresponding parts throughout the several views, there is seen in FIG. 1 a transmission shift lever assembly, generally designated 10, which includes a lever member 12 pivotally mounted in a universal bearing 14 on the axes intersecting at 16. The shift lever 12 has a lower portion 18 operatively connected to a conventional shift control rod assembly or shift cable assembly 20. The control rod assembly 20 is connected to a conventional countershaft type transmission, not shown. The upper end of lever 12 is capped by a handle or gripping portion 22.

The bearing 14 is secured to a vehicle floor panel 24 on which is supported a console or housing 26. The console 26 has secured thereto a boot cover 28 which encloses a portion of the shift lever 10 which extends through the housing 26. The upper end 30 of the housing boot cover 28 is attached to the lever member 12 by a plastic insert member 32.

Figure 4:
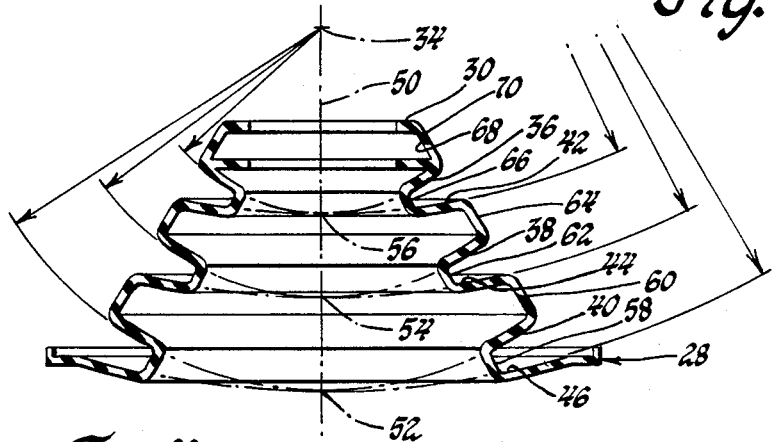
FIG. 4 is a view taken along line 4—4 of FIG. 1.
Figure 5:
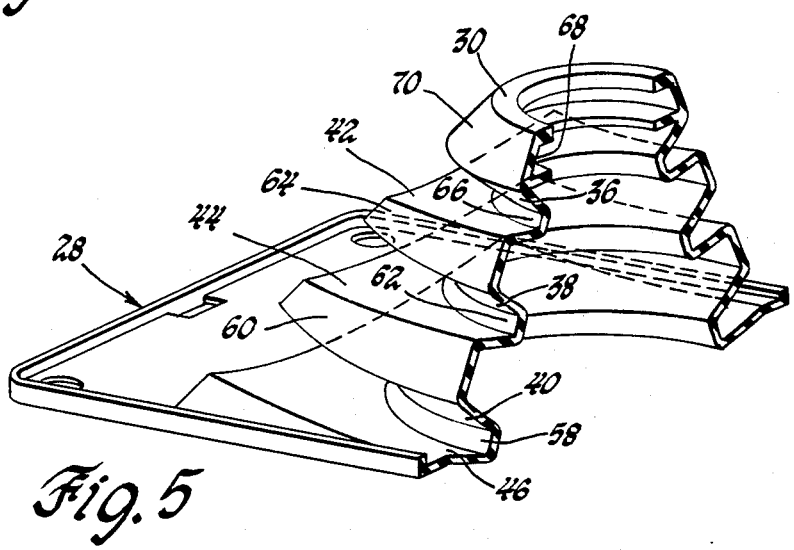
FIG. 5 is a sectional isometric view of the boot cover.

As seen in FIGS. 1 and 4 in particular, the boot cover 28 is generally frustopyramidal in shape. Tne sides of the pyramid are convoluted. The convolutes are generally spherical in shape with the respective spherical radius decreasing as the surfaces approach the apexes of the pyramid disposed at point 34. The convoluted shape shown has three upper spherical surfaces 36, 38 and 40, each of which has a center of radius at apex 34. The convoluted sidewalls also have lower spherical surfaces 42, 44 and 46, each of which has a center of radius at point 48, as seen particularly in FIG. 1. The distance between point 48 and point 34, at its minimum dimension, is equal to the distance between apex 34 and pivot axis 16. The points 34 and 48 are preferably disposed on the vertical axis 50 extending through the pivot axis 16 and the center of handle 22. The point 48 can be moved further from apex 34, as viewed in FIG. 1, so that the respective radii of surfaces 42, 44 and 46 will increase.

As best seen in FIG. 4, the axis 50 is substantially vertical through the center of boot cover 28. If the spherical surfaces 40 and 46 are extended, they would have a point of co-tangency at 52. Likewise, surfaces 38 and 44 would have a point of co-tangency at 54 while surfaces 36 and 42 would have a point of co-tangency at point 56.

As best seen in FIGS. 1, 3, 4 and 5, surfaces 46 and 40 are connected by a substantially conical surface 58 at their inner edges while surfaces 40 and 44 are connected by flat or planar surfaces 60 at their outer limits. Surfaces 44 and 38 are connected by a conical surface 62 while surfaces 38 and 42 are connected by flat planar surfaces 64. Surfaces 42 and 36 are connected by conical surface 66 and surface 36 is also connected by a conical surface 70 to the upper end 30 of boot 28. The upper end 30 has formed therein an annular recess or opening 68 adapted to receive the plastic member 32.

In FIG. 2, the lever member 12 is shown moved to one of the extreme positions which it must achieve during transmission operation. During the movement of the lever member 12 from the neutral position of FIG. 1 to the position shown in FIG. 2, the adjacent spherical surfaces such as 40 and 46 will undergo rolling action such that the gathering or bunching of the cover 28 is eliminated. With the occurrence of rolling action, there is very little external force applied to the shift lever from the boot cover. Due to the rolling action, the conical sidewalls 58, 62 and 66 on the expanding side of the cover have a tendency to remain in conical alignment. Likewise, the outer planar surfaces 60 and 64 also have a tendency to remain in alignment and project a line of action through the apex 34. This reduces the tendency of the expanded side of the boot cover to impose a neutral restoring force on the shift lever 12.

While the preferred embodiment of the present invention has a center of radii of the upper and lower spherical surfaces disposed at the position shown, it is possible to move the center of radii from point 48 sufficiently along the axis 50 to a point where the surfaces are essentially straight lines due to the extreme length of the radii involved. Even at these extreme conditions, rolling action between the upper conical surfaces 36, 38 and 40 shown, the lower surfaces 42, 44 and 46 will still occur, and the points of co-tangency as shown in FIG. 4 will remain. While the outer planar surfaces 60 and 64 are shown as a substantially pyramidal shape, it is possible to provide these surfaces in a conical shape should such an aesthetic appearance be more pleasing to the designer.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. An improvement in boot covers for a floor mounted manually operated transmission shift lever wherein the shift lever has a pivot axis and a handle longitudinally displaced from the pivot axis and wherein said boot cover is of a geometrical shape which converges toward an apex which is disposed substantially on the shift lever between the handle and the pivot axis; wherein the improvement comprises: said boot cover having a plurality of lower and upper spherical surfaces, each said lower surface having respective center of radii disposed at a common point displaced from the apex a distance equal to the distance between the apex and the pivot axis the largest of said radial dimensions being less than twice the distance between said apex and said pivot axis; and each said upper surface having a common center of radii disposed at the apex and the radial dimension of each said upper surface being less than the radial dimension of each said lower surface, each said lower surface being connected to each said upper surface immediately adjacent thereto and disposed toward said handle therefrom by an inner wall and to the other upper surface adjacent thereto by an outer wall.

2. An improvement in boot covers for a floor-mounted manually operated transmission shift lever wherein the shift lever has a pivot axis and a handle longitudinally displaced from the pivot axis and wherein said boot cover is of a geometrical shape which converges toward an apex disposed substantially on the shift lever between the handle and the pivot axis; wherein the improvement comprises: said boot cover having a top surface in one plane, a bottom surface substantially parallel with and displaced from said top surface, a plurality of concentric lower spherical surfaces, and a plurality of concentric upper spherical surfaces, each said lower spherical surface having center of radii disposed at a common point displaced from the apex a minimum distance equal to the distance between the apex and the pivot axis with the largest of said radial dimensions being less the distance between said common point and said pivot axis; and each said upper spherical surface having a point of tangency with a respective adjacent lower spherical surface and each said upper spherical surface having a common center of radii disposed at a distance from the respective tangency point equal to the distance from the apex to the respective tangency point of each said respective upper surface, each said upper surface being connected to each said lower surface immediately adjacent thereto and disposed toward said handle therefrom by an inner converging wall which is coplanar with a line passing through the apex and to each other upper surface adjacent thereto by an outer converging wall.

3. An improvement in boot covers for a floor-mounted manually operated transmission shift lever wherein the shift lever has a pivot axis and a handle longitudinally displaced from the pivot axis and wherein said boot cover is of a geometrical shape which converges toward an apex disposed substantially on a vertical axis extending through the pivot axis when the shift lever is in a neutral position; wherein the improvement comprises: said boot cover having a plurality of lower and upper outer spherical surfaces, each said lower surface having respective center of radii disposed at a common point displaced from the apex a distance equal to the distance between the apex and the pivot axis the largest of said radial dimensions being less than twice the distance between said apex and said pivot axis; and each said upper surface having a common center of radii disposed at the apex and the radial dimension of each said upper surface being less than the radial dimension of each said lower surface, each said lower surface being connected to each said upper surface immediately adjacent thereto by converging walls which are co-planar with lines passing through the apex.

* * * * *